United States Patent [19]
Crum

[11] Patent Number: 5,890,291
[45] Date of Patent: Apr. 6, 1999

[54] ENCLOSED BLADE FIXTURE FOR CUTTING HOSES

[75] Inventor: James E. Crum, Waterville, Ohio

[73] Assignee: Crum Manufacturing, Inc., Waterville, Ohio

[21] Appl. No.: 850,475

[22] Filed: May 5, 1997

[51] Int. Cl.[6] .................................................. B23D 21/06
[52] U.S. Cl. ................................... 30/92; 30/180; 30/182
[58] Field of Search ........................... 30/92, 272.1, 277, 30/277.4, 180, 182, 102

[56] References Cited

U.S. PATENT DOCUMENTS

| | | | |
|---|---|---|---|
| 2,629,926 | 3/1953 | Franck | 30/102 |
| 3,848,334 | 11/1974 | Mattera | 30/180 |
| 3,922,780 | 12/1975 | Green | 30/92 |
| 4,463,496 | 8/1984 | Reich et al. | 30/92 |
| 4,608,754 | 9/1986 | Kloster | 30/92 |
| 4,747,212 | 5/1988 | Cavdek | 30/92 |
| 5,012,579 | 5/1991 | Matsumoto | 30/92 |
| 5,070,616 | 12/1991 | Chen | 30/182 |
| 5,203,083 | 4/1993 | Domonoske | 30/92 |

*Primary Examiner*—Hwei-Siu Payer
*Attorney, Agent, or Firm*—Vanophem Meehan & Vanophem, P.C.

[57] ABSTRACT

A cutting device embodying a housing that fully encloses the knife blade in its retracted position. The cutting device has access slots in the sides of the housing that provide access to the interior of the housing without having to disassemble the housing. The cutting device can be operated manually through the access slots, or pneumatically by attaching a nose mount air cylinder to a threaded hole in the housing. An air source can be attached to an end of the housing opposite the threaded hole, for automatically removing scrap from the cutter.

10 Claims, 2 Drawing Sheets

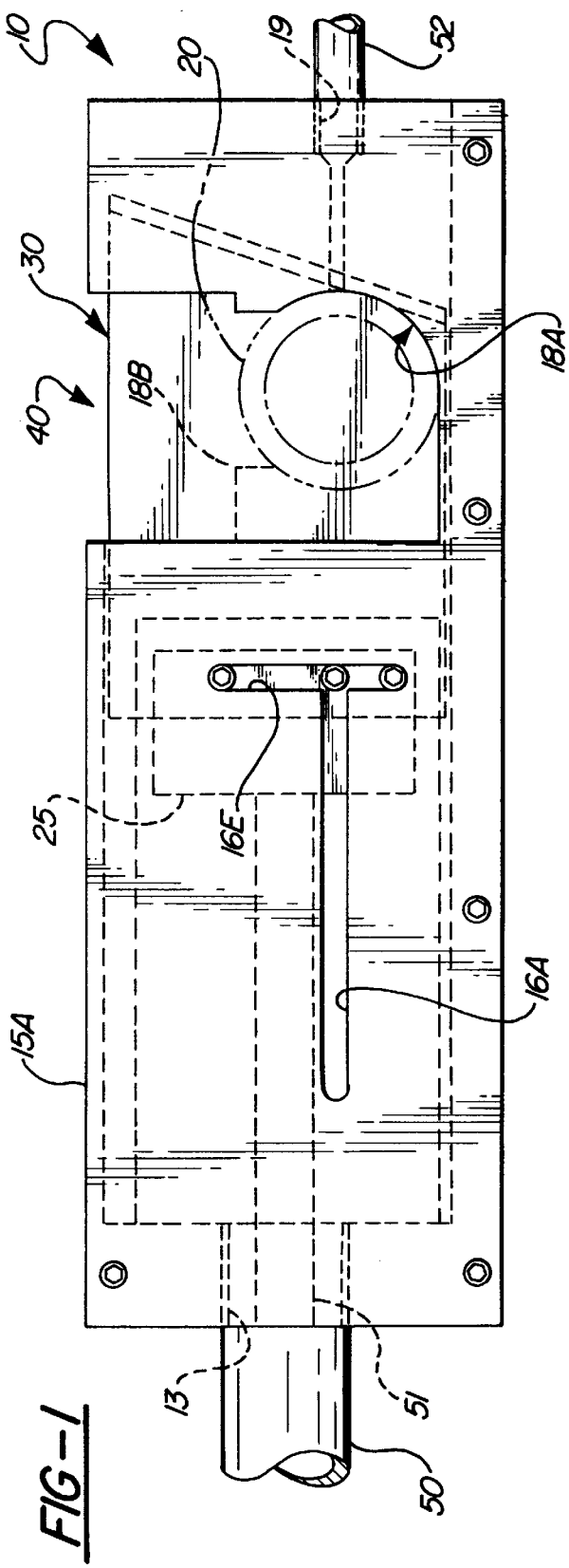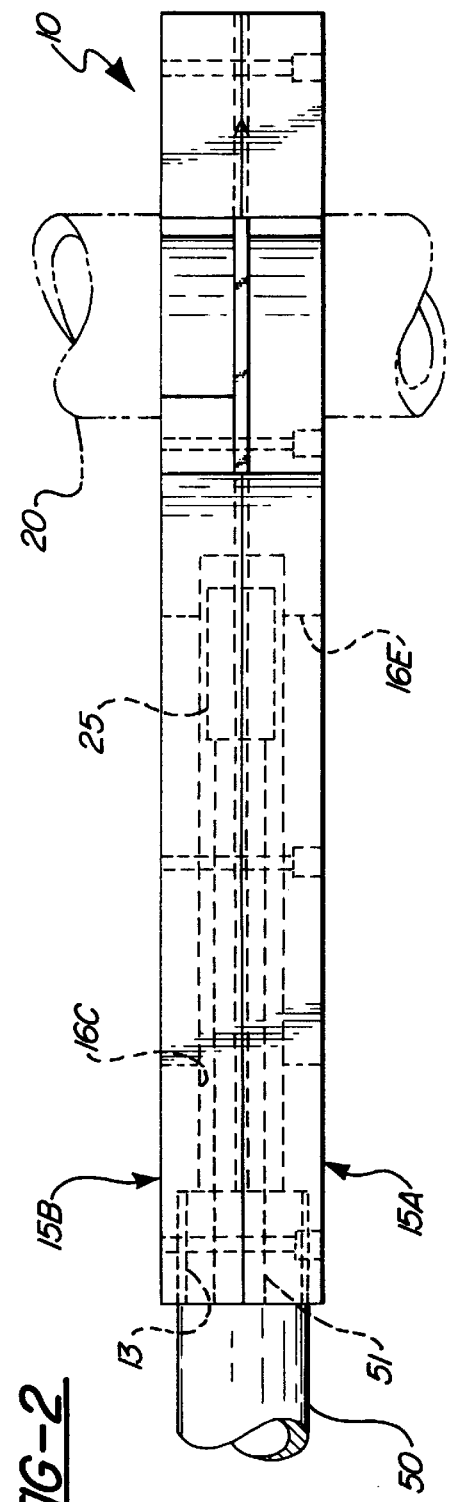

ENCLOSED BLADE FIXTURE FOR CUTTING HOSES

BACKGROUND OF THE INVENTION

1. Field of the Invention

The present invention relates to a cutting device for both reinforced and non-reinforced rubber hose, and more particularly to a fully enclosed blade that can be operated manually or pneumatically.

2. Description of the Prior Art

Cutting devices generally employ a blade moving in a direction perpendicular to the workpiece wherein the blade severs the workpiece through a shearing action. It is important to secure the workpiece firmly during the cutting action to prevent the workpiece from twisting or shifting, which causes an uneven, ragged, and misdirected cut.

In the past, cutting devices have relied on complicated or cumbersome means to secure the workpiece during the cutting operation. Some devices merely rely on the force of the blade itself acting upon the workpiece to hold the workpiece against a curved or grooved surface. Examples of such prior art devices can be found in U.S. Pat. No. 5,012,579 to Matsumoto; U.S. Pat. No. 4,608,754 to Kloster; U.S. Pat. No. 4,747,212 to Cavdek; U.S. Pat. No. 4,463,496 to Reich et al.; and U.S. Pat. No. 5,203,083 to Domonoske. Each of these references lacks means for positively retaining the workpiece in order to hold it steady relative to the cutting blade.

U.S. Pat. No. 3,922,780 to Green discloses a complex chain and lock mechanism which secures, spears, and shears a cable. The securing mechanism of Green requires that the chain link mechanism be tightened with a wrench to securely engage the workpiece.

Blade distortion is another problem that exists with prior art cutting devices. Prior art cutting devices allow the blade too much freedom to flex and bend. The flexing and bending put undue stress on the blade resulting in shorter blade life, and unexpected breakage.

Nowhere in the prior art is the problem of accessibility to the blade for removal and replacement addressed. For example, the Domonoske reference fully encloses the blade within the housing, yet fails to disclose any means for accessing the blade other than completely disassembling the cutting device. In addition, the blade is operated by means of a spring force. Therefore, when replacing a blade, a user must be extremely cautious in that the blade must be set against a spring located within the housing of the cutting device. It is extremely difficult to replace the blade in a spring loaded position wherein the possibility of releasing the spring tension and actuating the blade is highly likely. The housing portions must be disconnected, the blade removed, the new blade inserted with the spring loaded, and reconnecting the housing portions.

None of the prior art devices provides means for removing scrap without manually reaching into the cutting mechanism and risking contact with the knife blade or merely relying on the force of gravity to remove the scrap from the cutting device.

What is needed is a cutting device that fully encloses the blade for maximum safety to the user, allows safe and easy blade replacement without completely disassembling the housing, and automatically removes any scrap from the cutting apparatus without the need to manually reach into the device to remove scrap.

SUMMARY OF THE INVENTION

The present invention provides a cutting device comprising a housing which fully encloses the knife blade when the blade is in a retracted position. The cutting device has access slots in the sides of the housing which allow access to the knife blade without having to disassemble the housing. The cutting device can be operated manually through the access slots, or automatically by attaching an air line fitting to a threaded hole in one end of the cutter housing. Additionally, an air line can be attached to the cutter housing wherein any scrap is removed by force of air and the user does not need to reach into the cutting device, risking injury, to remove scrap.

It is an object of the present invention to provide a cutting apparatus that can be operated manually or pneumatically which fully encloses a knife blade within the cutter housing, eliminating risk of injury to the user.

It is another object of the present invention to securely engage the workpiece from both sides of the cutter housing to prevent distortion of the workpiece.

It is a further object of the present invention to provide access slots for easily removing and replacing the knife blade.

It is yet another object of the present invention to provide means for automatically removing scrap from the cutting apparatus.

Other objects and features of the present invention will become apparent from the detailed description when considered along with the accompanying drawings. It is to be understood that the detailed description and drawings are for illustrative purposes only and are not definitive of the limits of the invention, and should be taken in conjunction with the appended claims.

BRIEF DESCRIPTION OF THE DRAWINGS

FIG. 1 is a side view of the present invention with the blade in an extended position.

FIG. 2 is a top view of the present invention.

DETAILED DESCRIPTION OF THE PREFERRED EMBODIMENT

Figures 3, 4:
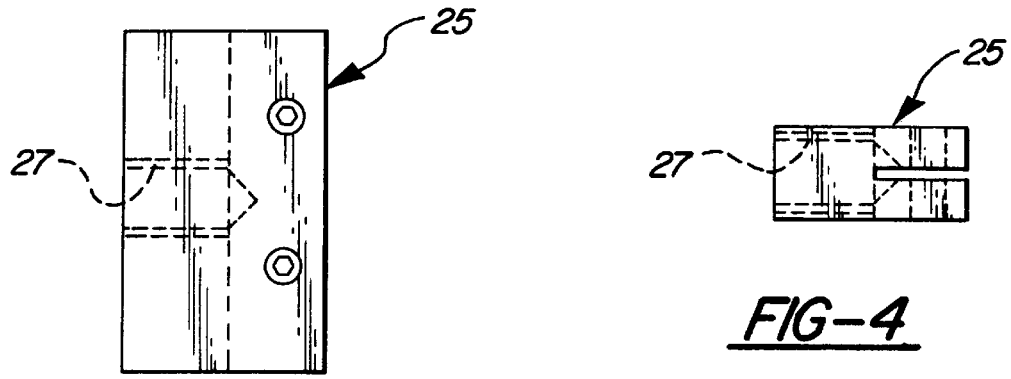
FIG. 3 is a side view of the blade engaging member of the cutting device of the present invention with the blade removed.
FIG. 4 is a top view of the blade engaging member of the present invention with the blade removed.
Figure 5:
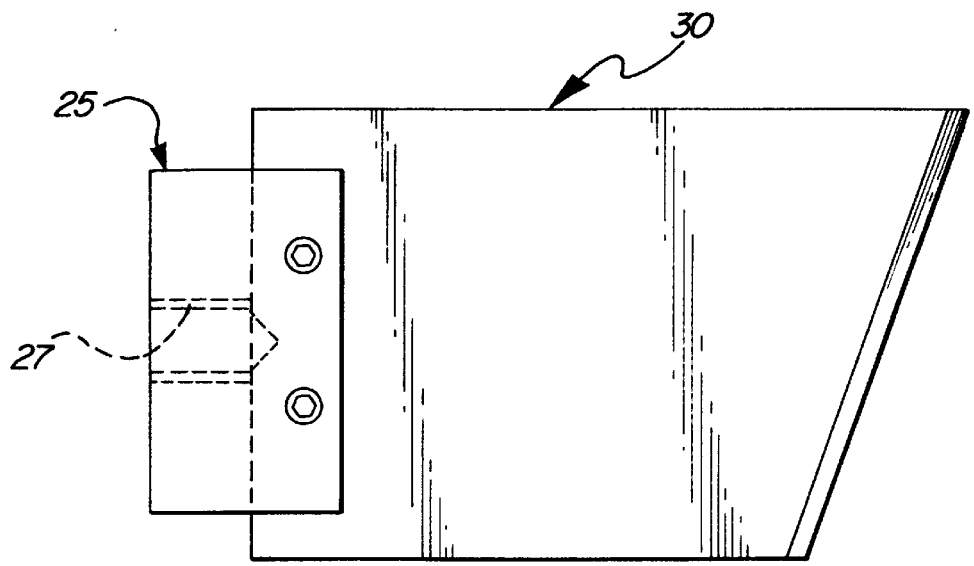
FIG. 5 is a side view of the blade engaging member with a blade attached.

FIG. 1 shows a cutting device 10 of the present invention. The cutting device 10 is used for cutting rubber hose 20, either reinforced or non-reinforced. The cutting device houses a blade engaging member 25, and a blade 30. The blade 30, when retracted, is fully enclosed within a housing 15. The cutting device 10 of the present invention can be operated either manually or pneumatically.

Figure 6:
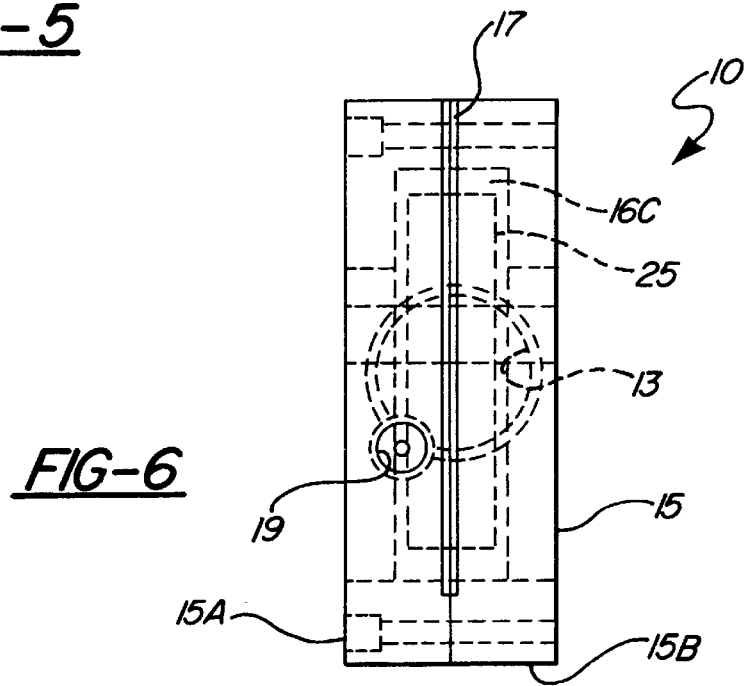
FIG. 6 is an end view of the present invention.

The cutting device 10 includes the housing 15 and a blade engaging member or mounting block 25. The housing 15 is comprised of two longitudinal halves 15A, 15B as shown in FIGS. 2 and 6. The longitudinal halves 15A, 15B each have an inner surface, an outer surface, a first end and a second end. The halves 15A, 15B are assembled with their inner surfaces facing each other and are fastened by any suitable means such as bolts or screws. A gap 17 remains between the inner surfaces of the halves 15A, 15B at the first end. The purpose of the gap 17 will be described in detail below.

A chamber 16C is created between the inner surfaces of the halves. The chamber 16C houses a blade engaging member 25. The chamber 16C must be sufficiently sized to allow the blade engaging member 25 to slidably move within the housing 15. When the blade 30 of the cutting device 10 is retracted, the blade engaging member 25 is located at the second end of the housing 15, opposite the first end of the housing 15. The blade 30, which is fastened to one end of the blade engaging member 25, is fully enclosed within the housing 15 in its retracted position. The length of the chamber 16C is less than the full length of the housing 15. The second end of the housing 15 has a threaded hole 13 which is adapted to accept a nose mount air cylinder 50 for pneumatic operation of the cutting device 10.

The blade engaging member 25 is enclosed within the housing 15 and moves back and forth in a longitudinal direction. The blade 30 is fastened to one end of the blade engaging member 25. The opposite end of the blade engaging member 25 has a bore 27 adapted to receive a rod 51 of a nose mount air cylinder 50. As the blade engaging member 25 slidably moves inside the housing 15, the blade 30 is extended and retracted. When the blade 30 is retracted, it is fully enclosed within the housing 15. When the blade 30 is extended it is located near the first end of the housing 15. FIG. 1 shows the blade 30 in a fully extended position.

The longitudinal halves 15A, 15B each have means for retaining the workpiece 20. The housing 15 has a clearing 40 located near the first end of the housing 15 for inserting the workpiece 20. Below the clearing 40, one longitudinal half 15B of the housing 15 has a semicircular profile 18B, shown in phantom in FIG. 1, for receiving and retaining the workpiece 20. The semi-circular profile 18B is nearly closed enabling the workpiece 20 to be inserted from the clearing 40 into the semicircular profile 18B. The other longitudinal half 15A has a profile 18A only half that of the profile 18B of the first longitudinal half 15B, for a purpose which will be described in detail below.

The semi-circular profile 18B and half semi-circular profile 18A securely retain the workpiece 20 and hold it steady during the cutting operation. As the blade 30 is extended, the workpiece 20 does not move or deform resulting in a clean, precise cut.

The longitudinal half 15A that has one half of a semi-circular profile 18A, has a hole 19 at its first end. The hole 19 is adapted to receive an air line fitting 52. Air pressure forcibly removes the severed workpiece 20 from the cutting device 10. The workpiece 20 is not supported at one side on one longitudinal half 15A. Therefore, it is free to move out of the cutting device 10 under the force of air through the hole 19.

The longitudinal halves 15A, 15B of the housing have slots 16A, 16B on their outer surfaces. The slots 16A, 166B provide access to the blade engaging member, allowing a user to remove and attach a blade, or manually extend and retract the blade. The slots 16A, 16B are generally T-shaped. The slots 16A, 16B run longitudinally along the longitudinal halves 15A, 15B for the length of the chamber 16C. The end 16E, 16F of the slots 16A, 16B located closest to the first end of the housing 15, run from and generally perpendicular to the longitudinal slots 16A, 16B. The perpendicular slot portion 16E, 16F allows access to the fasteners used to engage the blade 30 to the blade engaging member 25.

When removing and replacing a blade 30, the blade 30 is fully extended. The blade engaging member 25 is as close as possible to the first end of the housing 15. The fasteners of the blade engaging member are exposed via the perpendicular slot portion 16E, 16F. The fasteners are released and the blade 30 is disengaged from the blade engaging member 25. The blade slides out of the housing 15 through the gap 17 at the first end of the housing 15. A replacement blade, not shown, slides into the housing through the gap 17. The replacement blade is inserted into the blade engaging member 25 and the fasteners securely retain the new blade. There is no need to separate the halves 15A, 15B of the housing to access the blade 30. The slots 16E, 16F enable blade 30 changes without completely disassembling the cutting device 10.

Slots 16A, 16B can also be utilized for manually operating the blade 30. The slots 16A, 16B provide access to the blade engaging member 25, allowing a user to manually extend and retract the blade.

For pneumatic operation of the cutting device, a nose mount air cylinder 50 is attached at the threaded hole 13. The air cylinder's rod 51 is threadably attached to the bore 27 of the blade engaging member 25. As the air cylinder is operated, the rod 51 pushes or pulls the blade engaging member 25, extending or retracting the blade 30. The blade 30 is extended as the air cylinder rod 51 pushes the blade engaging member 25 from the second end of the housing 15 to the first end of the housing 15. The blade 30 is retracted as the rod 51 is pulled back into the air cylinder 50, dragging the blade engaging member 25 back to the second end of the housing 15.

The present invention provides a cutting device that securely engages the workpiece to provide a clean, precise cut that can be operated manually or pneumatically. The cutting device of the present invention does not need to be completely disassembled to gain access to the blade for replacement purposes. Slots provided on the housing allow quick and easy blade changes. In addition, the cutting device of the present invention automatically clears away the severed workpiece through air pressure. The principles and operation of the preferred embodiment of the invention have been described herein. It is to be understood that the invention may be modified other than as specifically described without departing from the scope of the invention as described above when taken in conjunction with the appended claims.

What is claimed is:

1. A device for cutting rubber hose comprising:

a housing having a front face, a rear face, a first end and a second end, said front face of said housing having a longitudinal slot, said longitudinal slot providing access to the interior of said housing, said housing having a threaded hole at said second end;

a blade engaging member disposed within said housing, said blade engaging member being slidably movable within said housing;

a blade removably fastened to said blade engaging member, said blade being slidably moveable within said housing from a retracted position to an extended position, said blade fully enclosed within said housing when said blade is in said retracted position; and means for retaining said rubber hose to be cut;

said means for retaining said rubber hose comprising:

a first retaining plate on said front face of said housing, said first retaining plate having a profile that circumscribes less than half of a diameter of solid rubber hose; and a second retaining plate on said rear face of said housing, said second retaining plate having a profile that circumscribes more than one half of a diameter of said rubber hose, wherein said first and second retaining plates retain said rubber hose and prevent said rubber hose from moving when said rubber hose is cut.

2. The cutting device of claim 1 and further comprising:

means for removing scrap after said rubber hose is cut.

3. A device for cutting rubber hose comprising:

a housing having a front face, a rear face, a first end and a second end, said front face of said housing having a longitudinal slot, said longitudinal slot providing access to the interior of said housing, said housing having a threaded hole at said second end;

a blade engaging member disposed within said housing, said blade engaging member being slidably moveable within said housing;

a blade removably fastened to said blade engaging member, said blade being slidably movable within said housing from a retracted position to an extended position, said blade fully enclosed within said housing when said blade is in said retracted position; and means for retaining said rubber hose to be cut;

wherein said threaded hole in said second end of said housing further comprises a nose mount air cylinder for actuating said slidable movement of said blade engaging member.

4. The cutting device of claim 3 wherein said nose mount air cylinder further comprises a rod threadably connected to said blade engaging member.

5. The cutting device of claim 3 and further comprising:

means for removing scrap after said rubber hose is cut.

6. A device for cutting rubber hose comprising:

a housing having a front face, a rear face, a first end and a second end, said front face of said housing having a longitudinal slot, said longitudinal slot providing access to the interior of said housing, said housing having a threaded hole at said second end;

a blade engaging member disposed within said housing, said blade engaging member being slidably movable within said housing; a blade removably fastened to said blade engaging member, said blade being slidably moveable within said housing from a retraced position to an extended position, said blade fully enclosed within said housing when said blade is in said retracted position; and means for retaining said rubber hose to be cut;

wherein said longitudinal slot in said housing further comprises means for accessing said blade engaging member to facilitate blade replacement.

7. The cutting device of claim 6 wherein said blade engaging member further comprises means for manually actuating said slidable movement of said blade engaging member by way of access through said longitudinal slot in said housing.

8. The cutting device of claim 6 and further comprising:

means for removing scrap after said rubber hose is cut.

9. A device for cutting rubber hose comprising:

a housing having a front face, a rear face, a first end and a second end, said front face of said housing having a longitudinal slot, said longitudinal slot providing access to the interior of said housing, said housing having a threaded hole at said second end;

a blade engaging member disposed within said housing, said blade engaging member being slideably movable within said housing;

a blade removably fastened to said blade engaging member, said blade being slidably moveable within said housing from a retracted position to an extended position, said blade fully enclosed within said housing when said blade is in said retracted position; and means for retaining said rubber hose to be cut;

wherein said rear face of said housing has a longitudinal slot for providing access to the interior of said housing.

10. The cutting device of claim 9 and further comprising:

means for removing scrap after said rubber hose is cut.

* * * * *